(12) United States Patent
Dolph et al.

(10) Patent No.: US 9,305,305 B2
(45) Date of Patent: *Apr. 5, 2016

(54) DELIVERING OFFERS

(71) Applicant: International Business Machines Corporation, Armonk, NY (US)

(72) Inventors: Blaine H. Dolph, Western Springs, IL (US); Jermaine C. Edwards, Allen, TX (US); Sumier Phalake, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 23 days.

This patent is subject to a terminal disclaimer.

(21) Appl. No.: 14/594,647

(22) Filed: Jan. 12, 2015

(65) Prior Publication Data

US 2015/0127456 A1    May 7, 2015

Related U.S. Application Data

(63) Continuation of application No. 13/623,176, filed on Sep. 20, 2012, now Pat. No. 8,977,707.

(51) Int. Cl.
| | | |
|---|---|---|
| *G06F 15/16* | (2006.01) | |
| *G06Q 30/02* | (2012.01) | |
| *G06F 17/30* | (2006.01) | |
| *H04L 29/08* | (2006.01) | |
| *H04L 29/06* | (2006.01) | |

(52) U.S. Cl.
CPC ...... *G06Q 30/0251* (2013.01); *G06F 17/30905* (2013.01); *G06Q 30/02* (2013.01); *G06Q 30/0277* (2013.01); *H04L 63/0428* (2013.01); *H04L 67/306* (2013.01)

(58) Field of Classification Search
CPC ............ H04L 67/306; H04L 63/0428; G06Q 30/0251; G06Q 30/027
USPC .................. 709/201, 202, 203, 217; 705/14.4
See application file for complete search history.

(56) References Cited

U.S. PATENT DOCUMENTS

| | | |
|---|---|---|
| 6,230,199 B1 | 5/2001 | Revashetti et al. |
| 6,285,985 B1 | 9/2001 | Horstmann |
| 6,370,578 B2 | 4/2002 | Revashetti et al. |
| 6,513,052 B1 | 1/2003 | Binder |

(Continued)

OTHER PUBLICATIONS

Office Action (Mail Date Jul. 8, 2014) for U.S. Appl. No. 13/623,176, filed Sep. 20, 2012; Confirmation No. 3794.

(Continued)

*Primary Examiner* — Cheikh Ndiaye
(74) *Attorney, Agent, or Firm* — Schmeiser, Olsen & Watts; Matthew Chung

(57) ABSTRACT

A method and system for delivering offers is provided. The method includes enabling for a user via a device, a Web browser and an associated URL. A processor determines a manufacturer and model of the device and that the device is associated with a shared device list. A user agent receives the manufacturer and model of the device and the processor transmits the user agent, the manufacturer and model of the device, and the associated URL. The manufacturer and model of the hardware device is extracted from the user agent and a rules engine is evaluated with respect to the manufacturer and model of the device. Specified content associated with the device is determined based on results of the evaluation. The specified content is transmitted to the Web browser.

15 Claims, 4 Drawing Sheets

(56) References Cited

U.S. PATENT DOCUMENTS

| | | |
|---|---|---|
| 6,895,387 B1 * | 5/2005 | Roberts et al. ............. 705/14.47 |
| 6,963,908 B1 | 11/2005 | Lynch et al. |
| 8,977,707 B2 | 3/2015 | Dolph et al. |
| 2002/0022453 A1 * | 2/2002 | Balog et al. ..................... 455/41 |
| 2002/0022993 A1 | 2/2002 | Miller et al. |
| 2005/0267809 A1 | 12/2005 | Zheng |
| 2007/0061328 A1 * | 3/2007 | Ramer et al. ................... 707/10 |
| 2009/0282468 A1 | 11/2009 | Banga et al. |
| 2010/0057843 A1 * | 3/2010 | Landsman et al. ........... 709/203 |
| 2010/0325168 A1 | 12/2010 | Luth et al. |
| 2011/0022653 A1 * | 1/2011 | Werth et al. .................. 709/202 |
| 2011/0185354 A1 * | 7/2011 | Tanner et al. ................. 717/178 |
| 2012/0047022 A1 | 2/2012 | Shamim et al. |
| 2014/0012676 A1 | 1/2014 | Forte |
| 2014/0082133 A1 | 3/2014 | Dolph et al. |

OTHER PUBLICATIONS

Amendment filed Sep. 25, 2014 in response to Office Action (Mail Date Jul. 8, 2014) for U.S. Appl. No. 13/623,176, filed Sep. 20, 2012; Confirmation No. 3794.

Notice of Allowance (Mail Date Oct. 31, 2014) for U.S. Appl. No. 13/623,176, filed Sep. 20, 2012; Confirmation No. 3794.

* cited by examiner

DELIVERING OFFERS

This application is a continuation application claiming priority to Ser. No. 13/623,176 filed Sep. 20, 2012.

FIELD

One or more embodiments of the invention relate generally to a method for targeting offers, and in particular to a method and associated system for delivering offers based on an initiating hardware device.

BACKGROUND

Presenting information to users typically includes an inaccurate process with little flexibility. Allowing presenters to manage the information may include a complicated process that may be time consuming and require a large amount of resources. Accordingly, there exists a need in the art to overcome at least some of the deficiencies and limitations described herein above.

SUMMARY

A first embodiment of the invention provides a method including: enabling for a user via a hardware device, by a computer processor of a computing system, a Web browser and an associated URL; determining, by the computer processor executing a content adaption browser plug-in of the Web browser, that the hardware device is associated with a shared device list; determining, by the computer processor executing the Web browser, a manufacturer and model of the hardware device; retrieving from the Web browser, by a user agent executed by the computer processor, the manufacturer and model of the hardware device; transmitting to a content adaption engine, by the computer processor executing the Web browser, the user agent, the manufacturer and model of the hardware device, and the associated URL; extracting from the user agent, by the computer processor executing the content adaption engine, the manufacturer and model of the hardware device; evaluating, by the computer processor executing the content adaption engine, a rules engine with respect to the manufacturer and model of the hardware device; determining based on results of the evaluating, by the computer processor executing the content adaption engine, specified content associated with the hardware device; and transmitting, by the computer processor, the specified content to the Web browser.

A second embodiment of the invention provides a computer program product, including a computer readable storage device storing a computer readable program code, the computer readable program code including an algorithm that when executed by a computer processor of computing system implements a method, the method including: enabling for a user via a hardware device, by the computer processor, a Web browser and an associated URL; determining, by the computer processor executing a content adaption browser plug-in of the Web browser, that the hardware device is associated with a shared device list; determining, by the computer processor executing the Web browser, a manufacturer and model of the hardware device; retrieving from the Web browser, by a user agent executed by the computer processor, the manufacturer and model of the hardware device; transmitting to a content adaption engine, by the computer processor executing the Web browser, the user agent, the manufacturer and model of the hardware device, and the associated URL; extracting from the user agent, by the computer processor executing the content adaption engine, the manufacturer and model of the hardware device; evaluating, by the computer processor executing the content adaption engine, a rules engine with respect to the manufacturer and model of the hardware device; determining based on results of the evaluating, by the computer processor executing the content adaption engine, specified content associated with the hardware device; and transmitting, by the computer processor, the specified content to the Web browser.

A third embodiment of the invention provides a computer system including a computer processor coupled to a computer-readable memory unit, the memory unit including instructions that when executed by the computer processor implements a method including: enabling for a user via a hardware device, by the computer processor, a Web browser and an associated URL; determining, by the computer processor executing a content adaption browser plug-in of the Web browser, that the hardware device is associated with a shared device list; determining, by the computer processor executing the Web browser, a manufacturer and model of the hardware device; retrieving from the Web browser, by a user agent executed by the computer processor, the manufacturer and model of the hardware device; transmitting to a content adaption engine, by the computer processor executing the Web browser, the user agent, the manufacturer and model of the hardware device, and the associated URL; extracting from the user agent, by the computer processor executing the content adaption engine, the manufacturer and model of the hardware device; evaluating, by the computer processor executing the content adaption engine, a rules engine with respect to the manufacturer and model of the hardware device; determining based on results of the evaluating, by the computer processor executing the content adaption engine, specified content associated with hardware device; and transmitting, by the computer processor, the specified content to the Web browser.

A fourth embodiment of the invention provides a process for supporting computing infrastructure, the process including providing at least one support service for at least one of creating, integrating, hosting, maintaining, and deploying computer-readable code in a computer system including a computer processor, wherein instructions contained in the code, when executed by the computer processor, performs a method including: enabling for a user via a hardware device, by the computer processor, a Web browser and an associated URL; determining, by the computer processor executing a content adaption browser plug-in of the Web browser, that the hardware device is associated with a shared device list; determining, by the computer processor executing the Web browser, a manufacturer and model of the hardware device; retrieving from the Web browser, by a user agent executed by the computer processor, the manufacturer and model of the hardware device; transmitting to a content adaption engine, by the computer processor executing the Web browser, the user agent, the manufacturer and model of the hardware device, and the associated URL; extracting from the user agent, by the computer processor executing the content adaption engine, the manufacturer and model of the hardware device; evaluating, by the computer processor executing the content adaption engine, a rules engine with respect to the manufacturer and model of the hardware device; determining based on results of the evaluating, by the computer processor executing the content adaption engine, specified content associated with hardware device; and transmitting, by the computer processor, the specified content to the Web browser.

DETAILED DESCRIPTION

Figure 1:
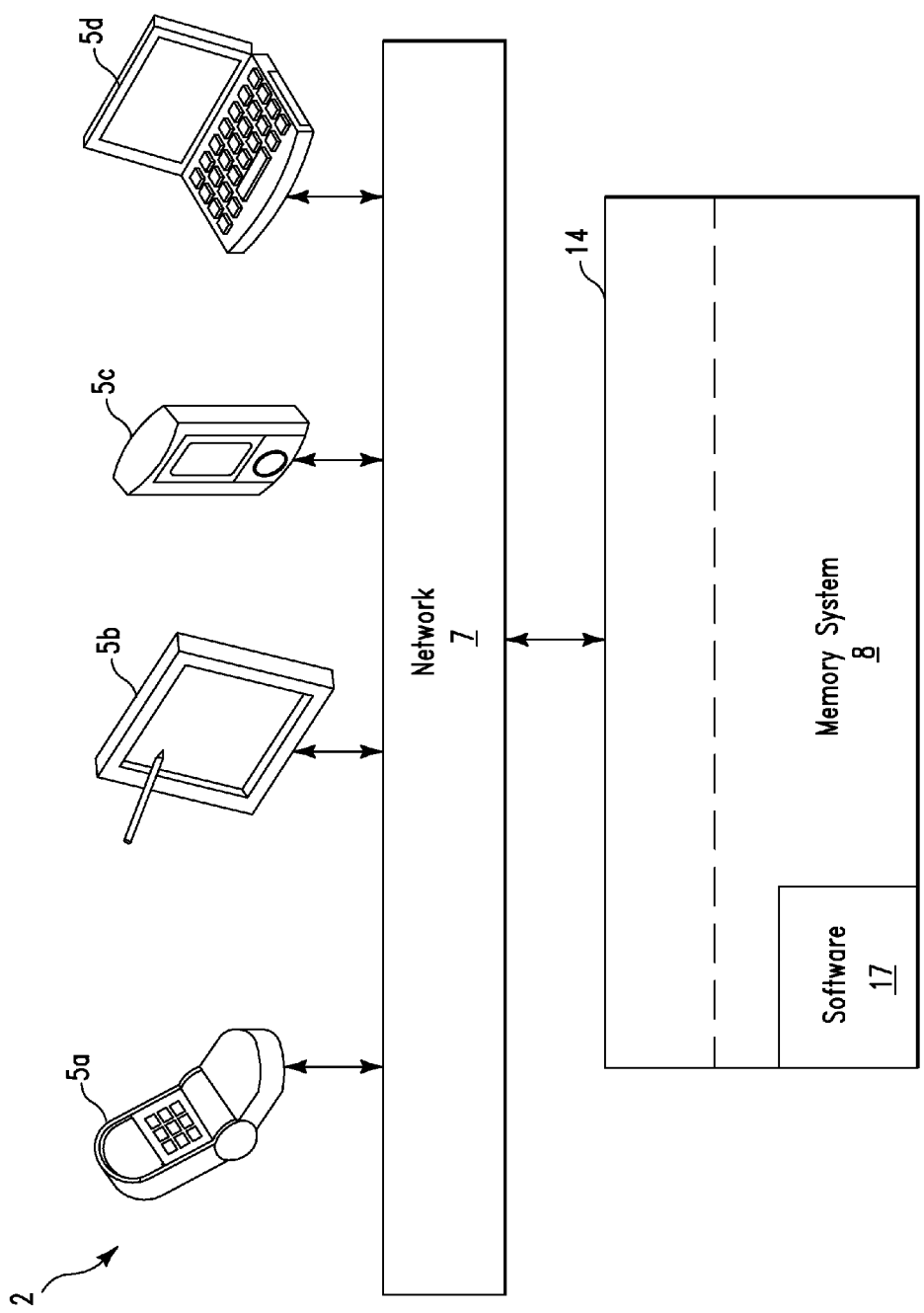
FIG. 1 illustrates a system for delivering targeted advertisements and offers to a user based on a hardware device belonging to the user, in accordance with embodiments of the present invention.

FIG. 1 illustrates a system 2 for delivering targeted advertisements and offers to a user based on a hardware device belonging to the user, in accordance with embodiments of the present invention. The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

System 2 allows a browser extension component and a content engine component to present targeted advertisements and offers to the user based on a hardware device. System 2 enables a list of websites to read system manufacturer and model information from a hardware device such that when a user visits a Website on a list, targeted advertisements and discounts are delivered to the user. Alternatively, a content engine component may customize advertisement content for delivery to the user based on make and model of the user's hardware device.

System 2 of FIG. 1 includes (client) hardware devices 5a . . . 5d connected through a network 7 to a client computing system 14. Network 7 may include any type of network including, inter alia, a local area network, (LAN), a wide area network (WAN), the Internet, a wireless network, etc. Hardware devices 5a . . . 5d may include any type of hardware device including, inter alia, a cellular telephone, a tablet computer, a PDA, a laptop computer, a desktop computer, an audio/video player, etc. Client computing system 14 includes a memory system that includes a software application 17 for delivering targeted advertisements and offers to a user based on a hardware device (e.g., hardware devices 5a . . . 5d) belonging to the user.

Software 17 enables hardware detection information to be obtained through a native browser plug-in that retrieves system manufacturer and model information. The native browser plug-in may be based on a Netscape plug-in application programming interface (NPAPI), a cross platform plug-in architecture, an Active X plugin for a Web browser, etc. Additionally, software application enables a process for using a hash to obscure a mac address or key shipped with a hardware device. In order to ensure that user information is secure, the hardware device manufacturer and model information may be encrypted over SSL. If it is determined that a user Web session is not secure, the hardware device manufacturer and model information is not transmitted over the Web.

System 2 executes software application 17 for performing a process for recognizing that a user is using a specific type of hardware device and in response specified offers are presented to the user. For example:

1. If a user is accessing the Internet with a laptop computer manufactured by company A and the user visits an online store associated with company A, a coupon for a 5% discount for any company A products purchased may be presented to the user.
2. If a user visits company A website from a company B tablet computer, the user may receive a 5% discount on any company B product ordered from company A.
3. If a user buys movie tickets from theater company A via a company B laptop for a company B movie, the user may receive a coupon for a free small popcorn.
4. A user experience and content of a Website may be adapted based on a hardware type. For example, users visiting an online retailer via a company A Laptop may be presented with laptop accessories and add-ons when they visit the Website for the online retailer.
5. A hardware device type may be used to push custom software to the user. For example, tablet computer users may be offered company A music applications when visiting a company A Website and video game applications may be offered when visiting the company A Website via a video game console.
6. A profile of a user may be progressively generated based on credentials provided to company A over the course of many interactions across different hardware devices thereby further customizing offers presented to the user. For example, if a user is known to own a laptop, an MP3 player, and a video game console, a visit to home application for the video game console may provide incentives and unlock add on features for the home application with respect to the laptop, MP3 player, and video game console.
7. News feeds may be provided that are related to the hardware device(s). For example, if a user experiences diagnostic issues with a hardware device, tech assistance may supplemented by a custom news feed and custom search feeds provided to the user as widgets in their applications.

Figure 2:
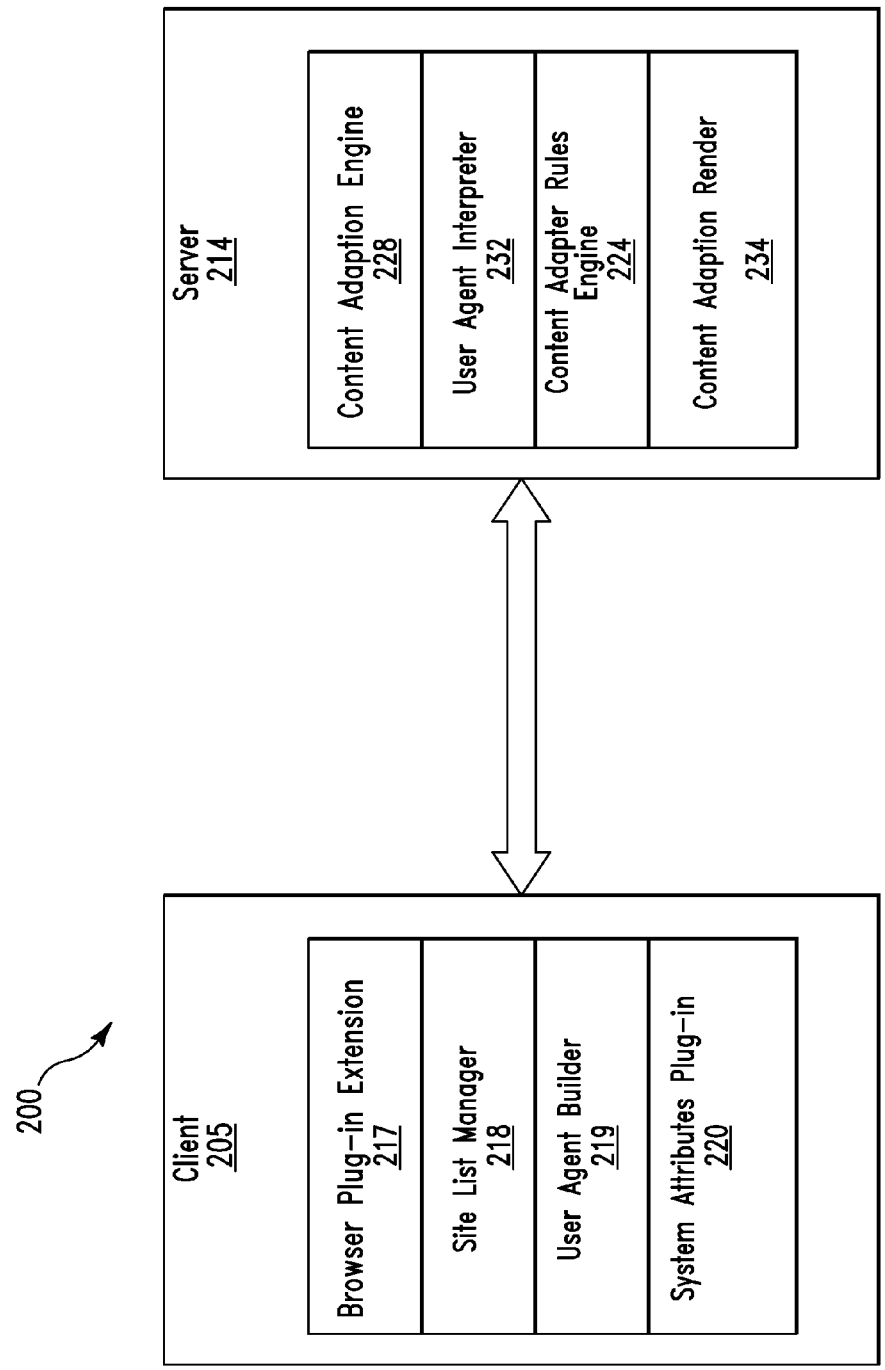
FIG. 2 illustrates a client server model enabled by the system of FIG. 1, in accordance with embodiments of the present invention.

FIG. 2 illustrates a client server model 200 enabled by system 2 of FIG. 1, in accordance with embodiments of the present invention. Client server model 200 of FIG. 2 includes a client device (or system) 205 (e.g., one of hardware devices 5a . . . 5d and/or client computing system 14 of FIG. 1) and a server (computing) system 214. Client server model 200 provides a secure mechanism to provide special offers to a user based on the user's hardware device manufacturer and model. Client server model 200 utilizes a Web browser's plug-in or extension architecture patterns to obtain hardware device information. Client device 205 includes a browser plug-in extension component 217, a site list manager component 218, a user agent builder component 219, and a system attributes plug-in component 220. Browser plug-in extension component 217 builds and provides hardware device manufacturer and model information to server system 214. Site list manager component 218 and user agent builder component 219 operate within a context of browser plug-in extension component 217. Site list manager component 218 manages a list of Websites that are authorized to hardware device manufacturer and model information.

User agent builder component 219 packages hardware device manufacturer and model information into an HTTP header of a user agent. An algorithm enabled by client server model 200 initializes by when a user opens a Web browser and enters Website URL into the Web browser. Browser plug-in extension component 217 intercepts the Web browser request and determines if the Website is authorized to transmit hardware device manufacturer and model information. If authorized, browser plug-in extension component 217 calls a native plug-in to request the hardware device manufacturer and model information. Browser plug-in extension component 217 packages the hardware device manufacturer and model information into a user agent and transmits a request to server system 214.

Server system includes a content adaption engine 228 that includes a user agent interpreter 232, a content adapter rules engine 224 (based on hardware device manufacturer and model information), and a content adaption render 234. Content adaption engine 228 receives a request and determines if the request includes a system user agent. If so, the hardware device manufacturer and model information is extracted from a user agent header and the hardware device manufacturer and model information is adapted based on the information and rendered to the user. The following description illustrates an implementation example for delivering targeted advertisements and offers to a user based on a hardware device belonging to the user:

As a first step, a user opens a Web browser and enters a Website. A site list manager determines that the user's hardware device is an available device on an authorized list. A browser plug-in calls a native plug-in to request a hardware device manufacturer and model information for the user's hardware device. The Web browser adds the hardware device manufacturer and model information to a user agent HTTP header and transmits a requested URL and the user agent to a server for the Website. The server extracts the hardware device manufacturer and model information from the user agent and adapts the hardware device manufacturer and model information. The adapted hardware device manufacturer and model information is returned to the Web browser.

Figure 3:
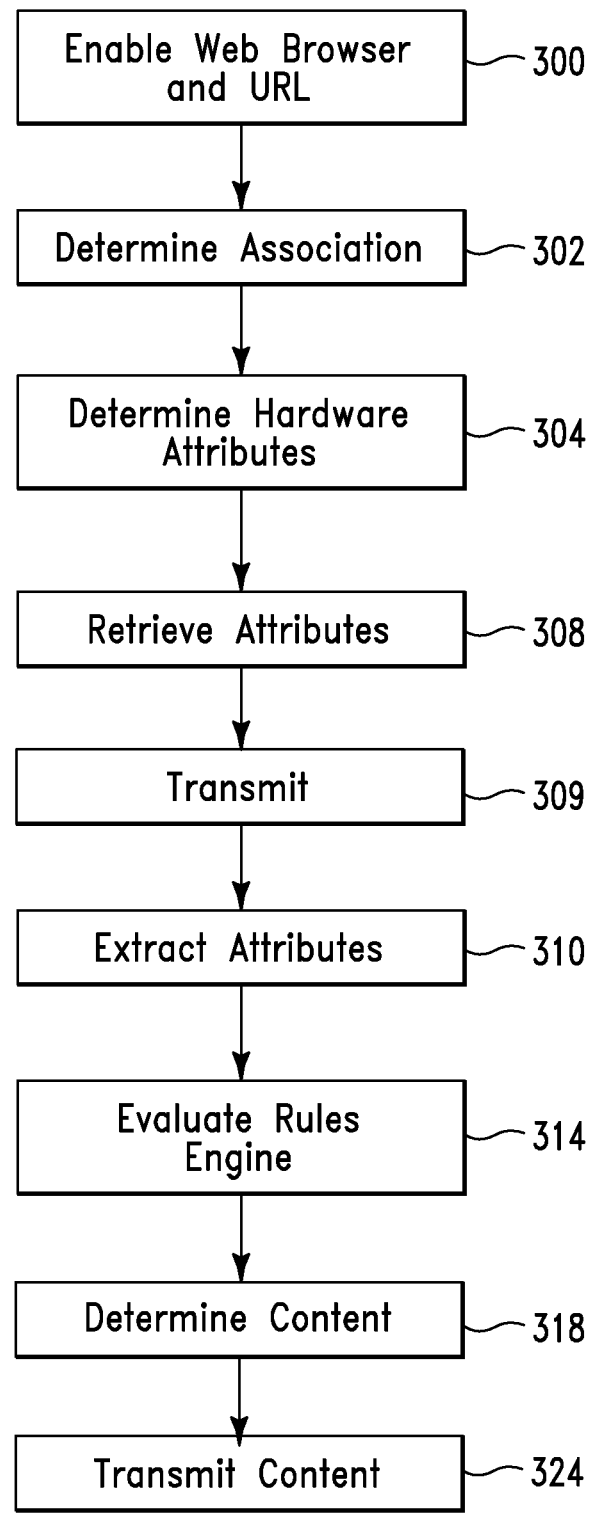
FIG. 3 illustrates an algorithm detailing a process flow enabled by the system of FIG. 11, in accordance with embodiments of the present invention.

FIG. 3 illustrates an algorithm detailing a process flow enabled by system 2 of FIG. 1 for delivering targeted advertisements and offers to a user based on a hardware device belonging to the user2, in accordance with embodiments of the present invention. Each of the steps in the algorithm of FIG. 3 may be enabled and executed by a computer processor executing computer code. In step 300, a user (via a hardware device) enables a Web browser and an associated URL. In step 302, the computer processor (executing a content adaption browser plug-in of the Web browser) determines that the hardware device is associated with a shared device list. In step 304, the computer processor (executing the Web browser) determines hardware attributes (e.g., a manufacturer and model) of the hardware device. In step 308, the computer processor retrieves from the Web browser (by a user agent) the attributes of the hardware device. In step 309, the computer processor transmits (to a content adaption engine) the user agent, the attributes of the hardware device, and the associated URL. In step 310, the computer processor extracts (from the user agent) the attributes of the hardware device. In step 314, computer processor (executing the content adaption engine) evaluates a rules engine with respect to the attributes of the hardware device. In step 318, the computer processor determines (based on results of the evaluation of step 314) specified content (advertising, coupons, offers, applications, software, etc) associated with the hardware device. In step 324, the computer processor transmits the specified content to the Web browser.

Figure 4:
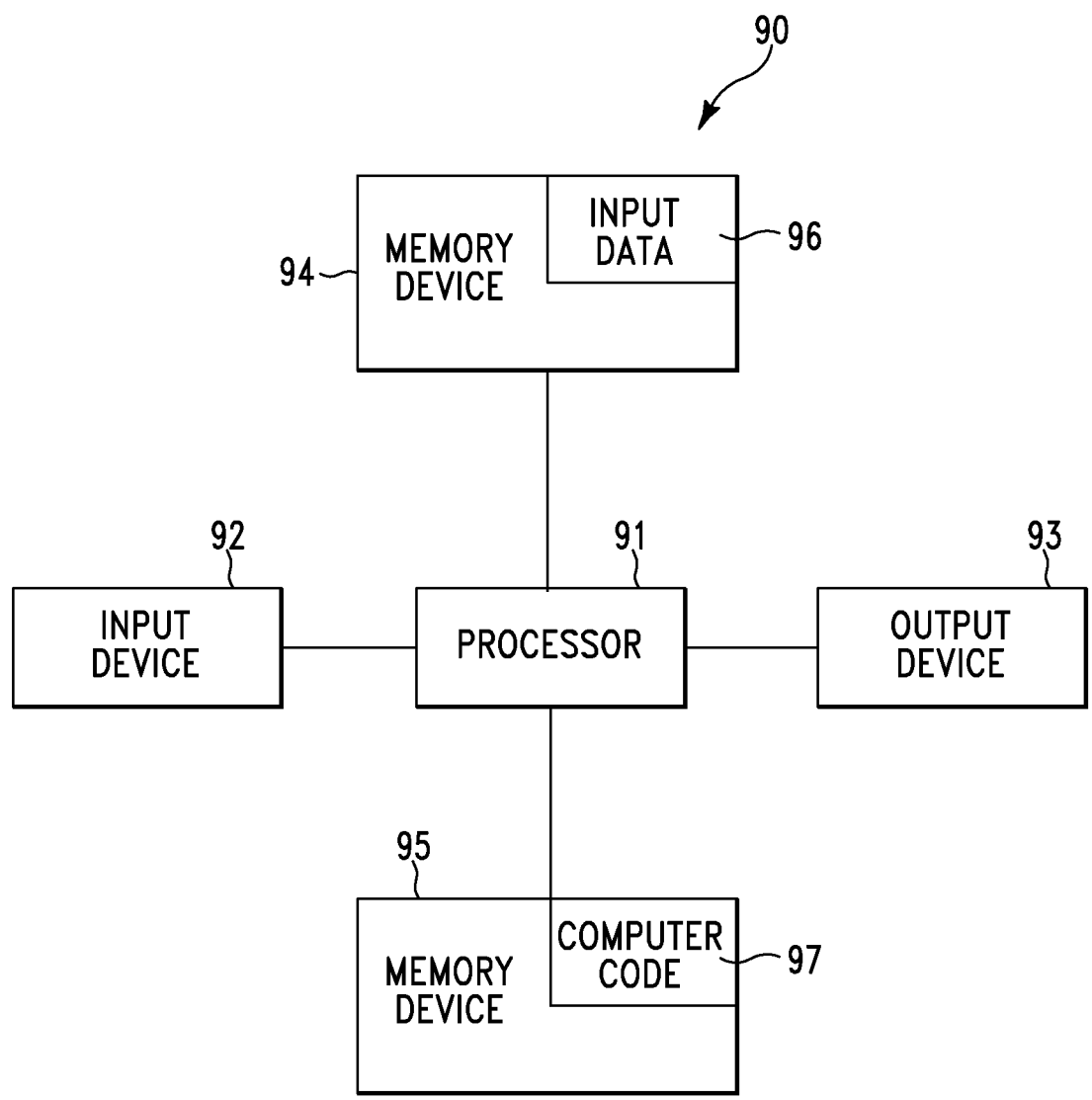
FIG. 4 illustrates a computer apparatus used by the system of FIG. 1 for delivering targeted advertisements and offers to a user based on a hardware device belonging to the user, in accordance with embodiments of the present invention.

FIG. 4 illustrates a computer apparatus 90 (e.g., client computing system 14 of FIG. 1) used by system 2 of FIG. 1 for delivering targeted advertisements and offers to a user based on a hardware device belonging to the user, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for delivering targeted advertisements and offers to a user based on a hardware device belonging to the user. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may include the algorithm of FIG. 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to deliver targeted advertisements and offers to a user based on a hardware device belonging to the user. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for delivering targeted advertisements and offers to a user based on a hardware device belonging to the user. In another embodiment, the invention provides a business method that performs the process steps of the invention on a subscription, advertising, and/or fee basis. That is, a service supplier, such as a Solution Integrator, could offer to deliver targeted advertisements and offers to a user based on a hardware device belonging to the user. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   determining, by a computer processor of a computing system executing a content adaption browser plug-in of a Web browser and an associated Uniform Resource Locator (URL), that a hardware device comprises an authorized available device in a shared device list;
   determining, by said computer processor, a manufacturer and model of said hardware device;
   encrypting, by said computer processor, the determined manufacturer and model of said hardware device;
   retrieving from said Web browser, by a user agent executed by said computer processor, said encrypted manufacturer and model of said hardware device;
   generating, by said computer processor, a hash obscuring a Media Access Control (MAC) address and key shipped with said hardware device;
   transmitting to a content adaption engine, by said computer processor executing said Web browser, said user agent, said encrypted manufacturer and model of said hardware device, and said associated URL;

extracting from said user agent, by said computer processor executing said content adaption engine, said encrypted manufacturer and model of said hardware device;

decrypting, by said computer processor said encrypted manufacturer and model of said hardware device;

evaluating, by said computer processor executing said content adaption engine, a rules engine with respect to said manufacturer and model of said hardware device with respect to Websites visited by said hardware device;

determining based on results of said evaluating, by said computer processor executing said content adaption engine, targeted advertisements and offers related to said hardware device; and transmitting, by said computer processor, said targeted advertisements and offers to said Web browser.

2. The method of claim 1, wherein said user agent is associated with an Hypertext Transfer Protocol (HTTP) header of said Web browser.

3. The method of claim 1, wherein said rules engine comprises rules associated with specific types of content with respect to specific types of hardware devices.

4. The method of claim 1, wherein said targeted advertisements and offers are associated with hardware portions of said hardware device.

5. The method of claim 1, wherein said targeted advertisements and offers are associated with said manufacturer and model of said hardware device.

6. A computer program product, comprising a computer readable hardware storage device storing a computer readable program code, said computer readable program code comprising an algorithm that when executed by a computer processor of computing system implements a method, said method comprising:

determining, by a computer processor of a computing system executing a content adaption browser plug-in of a Web browser and an associated Uniform Resource Locator (URL), that a hardware device comprises an authorized available device in a shared device list;

determining, by said computer processor, a manufacturer and model of said hardware device;

encrypting, by said computer processor, a the determined manufacturer and model of said hardware device;

retrieving from said Web browser, by a user agent executed by said computer processor, said encrypted manufacturer and model of said hardware device;

generating, by said computer processor, a hash obscuring a Media Access Control (MAC) address and key shipped with said hardware device;

transmitting to a content adaption engine, by said computer processor executing said Web browser, said user agent, said encrypted manufacturer and model of said hardware device, and said associated URL;

extracting from said user agent, by said computer processor executing said content adaption engine, said encrypted manufacturer and model of said hardware device;

decrypting, by said computer processor said encrypted manufacturer and model of said hardware device;

evaluating, by said computer processor executing said content adaption engine, a rules engine with respect to said manufacturer and model of said hardware device with respect to Websites visited by said hardware device;

determining based on results of said evaluating, by said computer processor executing said content adaption engine, targeted advertisements and offers related to said hardware device; and transmitting, by said computer processor, said targeted advertisements and offers to said Web browser.

7. The computer program product of claim 6, wherein said user agent is associated with an Hypertext Transfer Protocol (HTTP) header of said Web browser.

8. The computer program product of claim 6, wherein said rules engine comprises rules associated with specific types of content with respect to specific types of hardware devices.

9. The computer program product of claim 6, wherein said targeted advertisements and offers are associated with hardware portions of said hardware device.

10. The computer program product of claim 6, wherein said targeted advertisements and offers are associated with said manufacturer and model of said hardware device.

11. A computer system comprising a computer processor coupled to a computer-readable memory unit, said memory unit comprising instructions that when executed by the computer processor implements a method comprising:

determining, by a computer processor of a computing system executing a content adaption browser plug-in of a Web browser and an associated Uniform Resource Locator (URL), that a hardware device comprises an authorized available device in a shared device list;

determining, by said computer processor, a manufacturer and model of said hardware device;

encrypting, by said computer processor, a determined manufacturer and model of said hardware device;

retrieving from said Web browser, by a user agent executed by said computer processor, said encrypted manufacturer and model of said hardware device;

generating, by said computer processor, a hash obscuring a Media Access Control (MAC) address and key shipped with said hardware device;

transmitting to a content adaption engine, by said computer processor executing said Web browser, said user agent, said encrypted manufacturer and model of said hardware device, and said associated URL;

extracting from said user agent, by said computer processor executing said content adaption engine, said encrypted manufacturer and model of said hardware device;

decrypting, by said computer processor said encrypted manufacturer and model of said hardware device;

evaluating, by said computer processor executing said content adaption engine, a rules engine with respect to said manufacturer and model of said hardware device with respect to Websites visited by said hardware device;

determining based on results of said evaluating, by said computer processor executing said content adaption engine, targeted advertisements and offers related to said hardware device; and transmitting, by said computer processor, said targeted advertisements and offers to said Web browser.

12. The computer system of claim 11, wherein said user agent is associated with an Hypertext Transfer Protocol (HTTP) header of said Web browser.

13. The computer system of claim 11, wherein said rules engine comprises rules associated with specific types of content with respect to specific types of hardware devices.

14. The computer system of claim 11, wherein said targeted advertisements and offers are associated with hardware portions of said hardware device.

15. The computer system of claim 11, wherein said targeted advertisements and offers are associated with said manufacturer and model of said hardware device.

* * * * *